(12) United States Patent
Gierer et al.

(10) Patent No.: US 6,471,027 B1
(45) Date of Patent: Oct. 29, 2002

(54) PARKING BRAKE, NOTABLY FOR AUTOMATIC TRANSMISSION SYSTEMS OF MOTOR VEHICLES

(75) Inventors: Georg Gierer, Kressbronn (DE); Uwe Rühringer, Tettnang (DE); Jürgen Mittelberger, Weissensberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/744,534
(22) PCT Filed: Jul. 23, 1999
(86) PCT No.: PCT/EP99/05268
§ 371 (c)(1), (2), (4) Date: Jan. 25, 2001
(87) PCT Pub. No.: WO00/06928
PCT Pub. Date: Feb. 10, 2000

(30) Foreign Application Priority Data

Jul. 29, 1998 (DE) .......................... 198 34 156

(51) Int. Cl.$^7$ .............................. B60T 1/00; F16H 63/48
(52) U.S. Cl. ...................... 192/219.5; 188/31; 74/411.5
(58) Field of Search ........................ 192/219.4, 219.5; 188/31, 69; 74/411.5, 577 S; 303/89; 92/24

(56) References Cited

U.S. PATENT DOCUMENTS

| 2,974,752 A | | 3/1961 | Howard ........................ 188/69 |
| 3,043,403 A | * | 7/1962 | Kelley .......................... 188/69 |
| 3,110,363 A | * | 11/1963 | Chapman, Jr. et al. ........ 188/69 |
| 5,048,656 A | | 9/1991 | Braun ........................ 192/85 C |
| 6,186,047 B1 | * | 2/2002 | Baruffaldi ....................... 92/24 |

FOREIGN PATENT DOCUMENTS

| DE | 41 27 991 C2 | 7/1997 |
| DE | 196 25 019 A1 | 1/1998 |
| DE | 196 43 812 A1 | 5/1998 |
| EP | 0 356 769 A1 | 3/1990 |

* cited by examiner

*Primary Examiner*—Richard M. Lorence
(74) *Attorney, Agent, or Firm*—Davis & Bujold, P.L.L.C.

(57) ABSTRACT

Parking brake, notably for automatic transmissions of motor vehicles, which is released via hydraulic pressure acting on a spring accumulator (3) and which is additionally held in the released state by a locking system (13) is actuated by a magnet (5) through which a current flows. The locking system (13) is kept activated and thus the parking brake released until the magnet (5) in the position in which the locking system (13) is actuated, has a power consumption lower than necessary for loading the locking system (13).

7 Claims, 1 Drawing Sheet

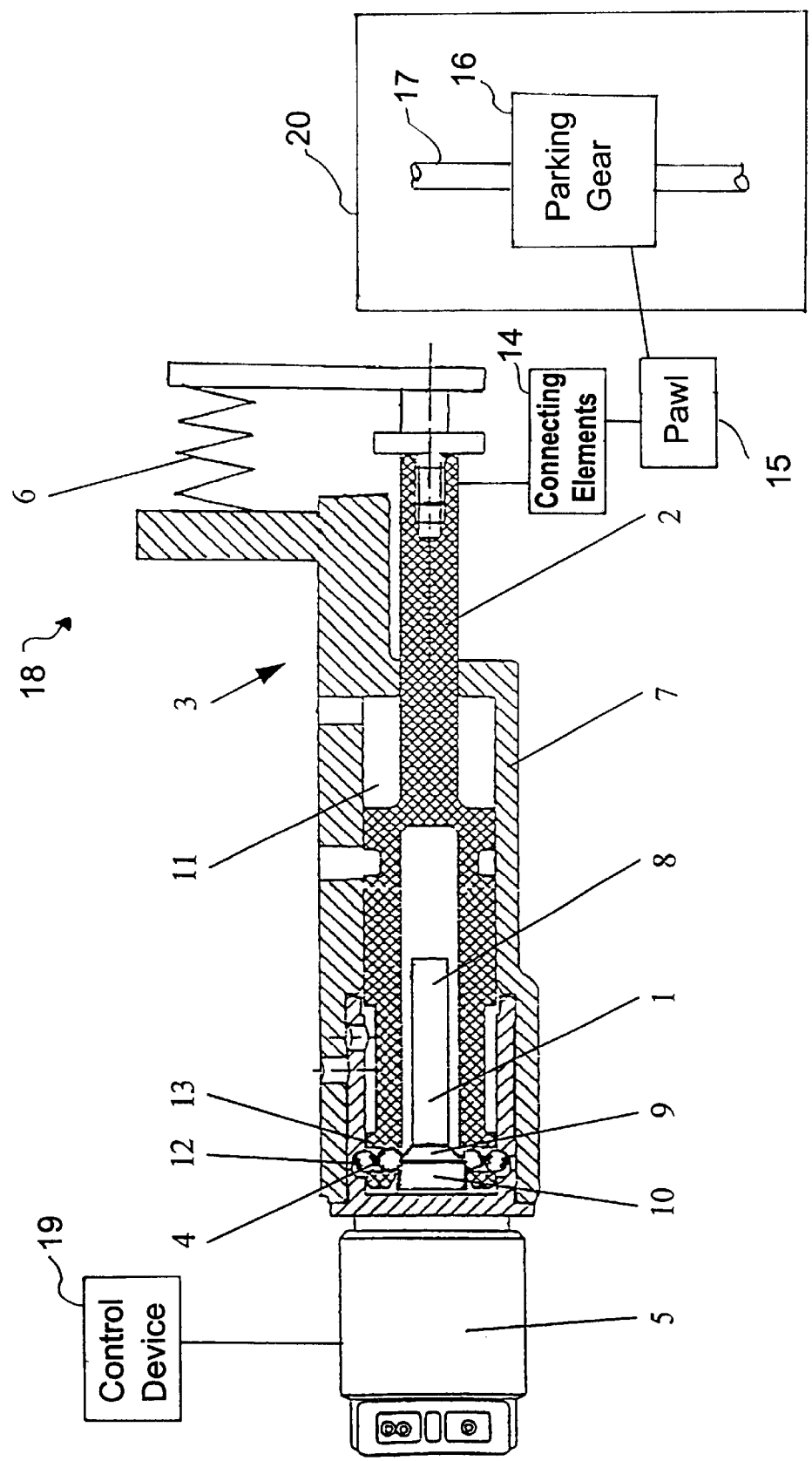

PARKING BRAKE, NOTABLY FOR AUTOMATIC TRANSMISSION SYSTEMS OF MOTOR VEHICLES

The invention relates to a parking brake for an automatic transmission.

BACKGROUND OF THE INVENTION

DE 196 25 019 describes a parking brake for automatic transmission of motor vehicles which is loaded by moving a piston rod of a spring accumulator on whose end is mounted a pawl which engages in a parking gear. When the spring accumulator is loaded with hydraulic pressure, the piston rod moves in the opposite direction and the pawl is disengaged from the parking gear. The parking brake can be kept in a disengaged state by a holding magnet which has the task of preventing an undesired loading of the parking brake which can be the case, e.g. as result of failure of the hydraulic pressure when the internal combustion engine is disengaged during travel. The magnet must be provided in such a manner that the holding force of the magnet is stronger than the tension of the spring accumulator in order that the parking brake cannot be engaged when the hydraulic system fails. The magnet has a very high power consumption to provide the holding force. Thereby an undesired discharge of the vehicle battery could occur when the internal combustion engine is switched off and the magnet is supplied with current.

The problem on which this invention is based is to provide a parking brake in which when the hydraulic pressure is lost, the parking brake can remain disengaged for a greater time.

SUMMARY OF THE INVENTION

According to the invention, a parking brake, disengaged by the hydraulic pressure, is held by a locking system which is actuated by current supply of an electromagnet. While the electromagnet is supplied with current, one stud of the electromagnet moves in an axial direction against a spring tension. The stud has three areas:

a first cylindrical area of small diameter;
a second conical area which connects with each of the first and third areas; and
a third area of larger cylindrical diameter.

In an operative state of the magnet, the stud is retained by spring tension in one end position and the locking system elements are located in the first area of the stud which has a smaller diameter. The locking system elements are disengaged in this state and the piston of the spring accumulator can move. If the magnet is supplied with current, the stud moves out of its first end position to the second end position. The locking system elements are pressed outwardly by the second conical area and engage in a recess of a stationary part of the parking brake and connect the piston of the spring accumulator with the stationary part. In order to move the locking system elements, the magnet requires greater power consumption. If the stud is in its second end position, the locking system elements produce on the cylindrical area of the stud clear radial forces and the stud must be held in this position, by the magnet, only against the spring tension of the magnet. The power consumption of the magnet in this position is very small so that when the vehicle engine is stationary, this state can be maintained over a longer period of time without the vehicle battery discharging inadmissibly quickly. While the locking system elements positively connect the piston of the spring accumulator with a stationary part of the spring accumulator, the piston cannot be moved by the force of the spring of the spring accumulator due to the lack of hydraulic pressure and thus the pawl does not engage the parking gear. In this state, the parking brake remains effectively released. When the magnet is switched off, the spring of the magnet presses the stud back to its first initial position and the locking system elements are pressed inwardly so that the piston of the spring accumulator is again freely movable and the pawl can engage in the parking gear. In a preferred embodiment, the locking system elements consist of at least one or more ball(s) which move outwardly due to displacement of the stud in the piston of the spring accumulator and engage in a recess of the stationary part of the spring accumulator. By using balls as elements of the locking system, the power consumption of the magnet for moving the stud can again be reduced, sine due to the point of contact of the balls, a weak moving force is needed.

BRIEF DESCRIPTION OF THE DRAWINGS

A preferred embodiment of the invention is shown in the description that follows with the appertaining drawing.

DESCRIPTION OF THE PREFERRED EMBODIMENTS

The single figure shows a spring accumulator 3 for automatic transmissions of motor vehicles which is comprised of a piston 2, a spring 6 and a stationary part 7. On the stationary part 7 is fastened an electromagnet 5 which consists of a spring (not shown) and a stud 1. The stud 1 is divided in three areas:

a first, cylindrical, area 8,
a second, conical, area 9; and
a third, cylindrical, area 10.

If the magnet 5 is off, the stud 1 is in the position in which the locking system elements 4 are located in the first area 8. The locking system elements 4 of the locking system 13 are in this position within the piston 2 so that the piston 2 is freely movable in an axial direction. On the piston 2 are fastened connecting elements 14 and a pawl 15 which engages in a parking gear 16 as a result of the displacement of the piston 2 by the spring 6. By applying a hydraulic pressure in a piston chamber 11, the piston 2 is moved to the opposite end position against the tension of the spring 6 and the pawl 15 releases the parking gear 16 of a shaft 17 of the automatic transmission. In this state, the magnet 5 can be supplied with current and the stud 1 is moved in an axial direction. At the same time, the locking system elements 4 are pressed outwardly by the conical second area and lock the piston 2 while they engage in a recess 12 of the stationary part 7 of the spring accumulator 3. The stud 1 is moved in an axial direction up to its end stop until the cylindrical third area 10 prevents the locking system elements 4 from going back to their initial position. By the locking system elements 4 being able to move in only a radial direction and the third area 10 being a cylindrical area, only radial forces are exerted on the stud 1 so that the retaining force of the magnet 5 and thus the power consumption are considerably reduced in this position. If the hydraulic pressure drops in the piston chamber 11 while the internal combustion engine of the motor vehicle is switched off, the tension of the spring 6 cannot activate the parking brake 18, since the locking system elements 4 retain the piston 2 in its position until the magnet 5 is switched off-circuit. If the parking brake 18 is activated by the tension of the spring 6, it cannot be deactivated exclusively by current supply of the magnet 5. The parking brake 18 for the automatic transmission 20 is activated via an actuation signal triggered via a control device 19.

REFERENCE NUMERALS 1 stud
2 piston
3 spring accumulator
4 locking system element
5 magnet
6 spring
7 stationary part
8 first area
9 second area
10 third area
11 piston chamber
12 recess
13 locking system

What is claimed is:

1. A parking brake for an automatic transmission of a motor vehicle in which, upon an actuation signal triggered via a control device, a pawl one of engages and disengages a parking gear on a shaft of the automatic transmission for one of blocking and releasing the automatic transmission, the pawl engaging the parking gear as a result of displacement of a spring accumulator (3) and the pawl disengaging the parking gear by hydraulic pressure supplied to the spring accumulator (3) and inducing prestressing of a spring of the spring accumulator (3), and the pawl being held in a disengaged state by the hydraulic pressure and an electromagnet (5);

the electromagnet (5), when supplied with current, actuates a locking system (13) to maintains a previously pressure-loaded position of the spring accumulator (3), the electromagnet (5) has a relatively high power consumption when the electromagnet (5) is actuated and the locking system is initially loaded while the electromagnet (5) has a relatively lower power consumption, following initial loading, when the electromagnet (5) is maintaining the locking system in a loaded state until the electromagnet (5) is switched off and, thereafter, the locking system (13) is released and the parking brake (18) is actuated via the spring accumulator (3) and the pawl (15) engages the parking gear (16).

2. The parking brake according to claim 1, wherein the locking system (13) is actuated by the electromagnet (5) which moves a stud (1) in an axial direction when the electromagnet (5) is supplied with the current; the stud (1) has a first cylindrical area (8) and a second cylindrical area (10) which are interconnected with one another by a conical area (9), the conical area (9) displaces a locking element (4) of the locking system (13) in order to connect a movable part (2) of the spring accumulator (3) with a stationary part (7) of the parking brake, and the locking element (4) is located in an end position upon the second cylindrical area (10) of the stud (1).

3. The parking brake according to claim 2, wherein the locking element (4) of the locking system (13) comprises at least one ball which engages with a recess (12) of the stationary part (7) via radial displacement of the at least one ball.

4. The parking brake according to claim 3, wherein the recess (12) comprises an annular groove formed in the stationary part (7).

5. The parking brake according to claim 1, wherein the spring accumulator (3) comprises a stationary part (7) and a piston (2) which is moveable in a first direction, relative to the stationary part (7), by the spring of the spring accumulator (3) and the piston (2) is moveable in a second opposite direction by hydraulic pressure supplied to the spring accumulator (3).

6. The parking brake according to claim 5, wherein when the locking system (13) is inactive, the piston (2) is freely movable in an axial direction relative to the stationary part (7).

7. The parking brake according to claim 1, wherein the spring accumulator (3) comprises a stationary part (7) and a moveable piston (2) and if the hydraulic pressure drops in the spring accumulator (3) and the locking system (13) is active, tension of the spring is prevented from activating the parking brake (18) because the locking system (13) retains the piston (2) in a preloaded position until the magnet is switched off-circuit.

* * * * *